United States Patent

Harris

(10) Patent No.: US 7,496,366 B2
(45) Date of Patent: Feb. 24, 2009

(54) WIRELESS COMMUNICATION SYSTEM CAPACITY CONTROL FACILITATION METHOD AND APPARATUS

(75) Inventor: John M. Harris, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 415 days.

(21) Appl. No.: 11/311,646

(22) Filed: Dec. 19, 2005

(65) Prior Publication Data

US 2007/0142056 A1    Jun. 21, 2007

(51) Int. Cl.
*H04Q 7/20* (2006.01)
(52) U.S. Cl. ............. 455/452.2; 455/450; 455/452.1; 370/230.1; 370/252; 709/238
(58) Field of Classification Search ......... 455/452.2, 455/450, 452.1; 370/230.1, 252; 709/238
See application file for complete search history.

(56) References Cited

U.S. PATENT DOCUMENTS

| | | | | |
|---|---|---|---|---|
| 5,982,760 A | * | 11/1999 | Chen | ............ 370/335 |
| 6,665,283 B2 | | 12/2003 | Harris et al. | |
| 2003/0202469 A1 | * | 10/2003 | Cain | ............ 370/230 |
| 2003/0204587 A1 | * | 10/2003 | Billhartz | ............ 709/224 |
| 2004/0203820 A1 | * | 10/2004 | Billhartz | ............ 455/452.1 |

* cited by examiner

*Primary Examiner*—Danh C Le

(57) ABSTRACT

System capacity control in a wireless communication system can be facilitated with respect to a mobile to mobile communication. Such facilitation can comprise adjusting (103) a quality of service for at least one leg of that mobile to mobile communication. More particularly, this facilitation can comprise obtaining information (101) regarding at least one of power requirements as correspond to each leg of the mobile to mobile communication, a number of mobile stations as comprise communication targets in the mobile to mobile communication and that do not share a same sector using a shared channel, and/or expected battery life for at least one mobile station as comprises the mobile to mobile communication. These teachings can then provide for relatively degrading quality of service on a leg of the mobile to mobile communication as corresponds to at least one of relatively low mobile station power requirements, a leg comprising a reverse speaker leg and corresponding target legs are relatively few in number, and/or a leg comprising a reverse speaker leg and the corresponding mobile station has a relatively low expected battery life.

17 Claims, 2 Drawing Sheets

100

200

WIRELESS COMMUNICATION SYSTEM CAPACITY CONTROL FACILITATION METHOD AND APPARATUS

TECHNICAL FIELD

This invention relates generally to wireless communications and more particularly to system capacity control.

BACKGROUND

Wireless communication systems of various kinds are known in the art. Increasingly, such wireless communication services provide support for relatively high bandwidth applications and services such as, but not limited to, streaming services. (Those skilled in the art will understand "streaming" to refer to technologies that permit relatively continuous playback of downloaded content (such as audio and/or video content) during the transfer of such content to the playback platform.)

Existing systems typically provide such services as streaming services without sufficient regard for system capacity management (and particularly improvement of capacity management). Such issues can be particularly telling with respect to mobile-to-mobile communications (and perhaps even more so with mobile-to-many-mobiles communications) where at least two different communication links (often referred to as legs) are used to facilitate delivery of content from one mobile platform to another.

As a result, present practices may lead to system user experiences that can vary considerably from one communication to the next (or even within a same communication session) due to various exigencies and circumstances that typify wireless communications notwithstanding relatively aggressive attempts to provide a relatively highest level of service as can be relatively provided on a leg-by-leg basis. The latter efforts, in turn, result in a relatively diminished overall system capacity and hence can impact how many users and sessions can be accommodated by the communication system itself.

BRIEF DESCRIPTION OF THE DRAWINGS

The above needs are at least partially met through provision of the wireless communication system capacity control facilitation method and apparatus described in the following detailed description, particularly when studied in conjunction with the drawings, wherein.

Figure 1:
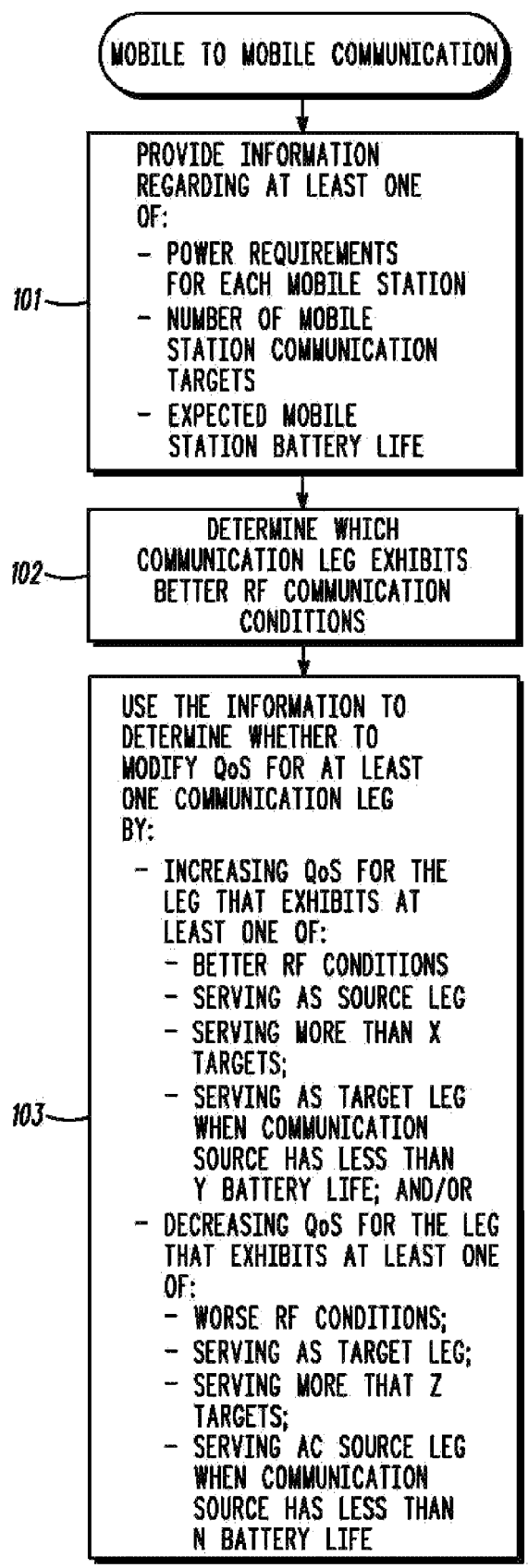
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, system capacity control in a wireless communication system can be facilitated with respect to a mobile to mobile communication. Such facilitation can comprise adjusting a quality of service for at least one leg of that mobile to mobile communication.

More particularly, this facilitation can comprise obtaining information regarding at least one of power requirements as correspond to each leg of the mobile to mobile communication, a number of mobile stations as comprise communication targets in the mobile to mobile communication and that do not share a same sector using a shared channel, and/or expected battery life for at least one mobile station as comprises the mobile to mobile communication. These teachings can then provide for relatively degrading quality of service on a leg of the mobile to mobile communication as corresponds to at least one of relatively low mobile station power requirements, a leg comprising a reverse speaker leg and corresponding target legs are relatively few in number, and/or a leg comprising a reverse speaker leg and the corresponding mobile station has a relatively low expected battery life.

By one approach these actions are taken while at least maintaining quality of service on remaining legs of the mobile to mobile communication. Viewed generally, by avoiding the provision of a level of quality of service on at least one leg of a multi-leg communication that unduly exceeds the overall quality of service that a given end user will otherwise likely experience, these teachings aid in avoiding an over-allocation of system resources in support of corresponding communications. So configured and arranged, end-to-end user experiences tend to remain relatively undisturbed while, simultaneously, wireless communication system capacity improves.

These and other benefits may become clearer upon making a thorough review and study of the following detailed description. Referring now to the drawings, and in particular to FIG. 1, these teachings are particularly suitable for use in facilitating system capacity control in a wireless communication system with respect to one or more mobile to mobile communications. Such a mobile to mobile communication may comprise, for example, a voice communication, a file transfer, a data transfer as corresponds to current game play, a presence update, a video communication, a music communication, a push-to-talk communication, call control signaling, Session Initiation Protocol-compatible signaling, a bidirectional transfer, a half-duplex transfer, and so forth with other mobile to mobile communications being available and others likely to be developed hereafter.

By this process 100 (as implemented, for example, by a corresponding network element as discussed below in more detail) one provides 101 information that will serve to inform a subsequent decision regarding altering a quality of service level as corresponds to at least one leg of the mobile to mobile communication. Such information can vary with the needs and/or requirements of a given application setting. Illustrative examples include, but are not limited to:

power requirements for each mobile station as comprise the mobile to mobile communication (for example, information regarding received signal strength as corresponds to one or more of these mobile stations);

a number of mobile stations as comprise communication targets in the mobile to mobile communication (for example, information regarding a total number of mobile stations as comprise the communication targets for this mobile to mobile communication and/or information regarding a number of infrastructure communication resources (such as, but not limited to, shared channels, shared sectors, shared Walsh codes, and so forth) of the wireless communication system as are used, substantially in parallel, to support this mobile to mobile communication);

expected battery life for at least one mobile station as comprises the mobile to mobile communication (such as, for example, a mobile station that presently sources content to be provided to one or more target mobile stations via the mobile to mobile communication);

to name a few.

This process 100 then provides for determining 102 which leg of the mobile to mobile communication exhibits better radio frequency communication conditions. Those skilled in the art will recognize and understand that there are various tests and criteria upon which such a determination can be based. By one approach "better radio frequency communication conditions" can refer, for example, to better pilot signal strength, better channel quality indications, and/or better signal to interference metrics (as may be viewed instantaneously, on average, and/or with respect to a longer-term average and/or variance) (though, in general, this concept does not relate to an amount of remaining capacity in a given sector).

This process 100 then uses 103 this information to determine whether to modify the quality of service for at least one leg of the mobile to mobile communication. Those skilled in the art will understand that there are numerous ways by which quality of service can be modified. To illustrate without intending to suggest a limit to such options, quality of service can be adjusted by modifying at least one of:
  delay jitter;
  scheduling priority;
  block error rate;
  block error loss;
  bit rate;
  inactivity timer;
  anticipatory link creation;
  anticipatory partial link establishment;
  anticipatory resource allocation;
  an anticipatory request;
  anticipatory overhead message scanning; and/or
  anticipatory placement of a mobile station into a mobility tracking mode.

To be more specific, as per these teachings such modification of the quality of service can be effected by increasing the quality of service for the leg of the mobile to mobile communication that exhibits at least one predetermined characteristic and/or by decreasing the quality of service for the leg that exhibits at least one predetermined characteristic. For example, the quality of service can be increased for a leg that exhibits at least one of:
  better radio frequency communication conditions than other legs in the mobile to mobile communication;.
  serving as a source leg in a mobile to mobile communication serving more than a threshold number of communication targets; and/or
  serving as a target leg and a source of the mobile to mobile communication has less than a threshold amount of battery life remaining.

As another example, the quality of service can be decreased for a leg that exhibits at least one of:
  worse radio frequency communication conditions than other legs in the mobile to mobile communication;
  serving as a target leg in a mobile to mobile communication serving more than a threshold number of communication targets;
  serving as a communication source leg in a mobile to mobile communication where a source of the mobile to mobile communication has less than a threshold amount of battery life remaining.

By using information both regarding some aspect of one or more mobile stations (such as, for example, corresponding power requirements, expected battery life, and/or the number of mobile station communication targets) and regarding which communication leg exhibits better radio frequency communication conditions, a corresponding decision can be made regarding whether, and how, to modify the quality of service for at least one leg of the corresponding mobile to mobile communication.

For example, when the information regarding mobile stations comprises information regarding expected battery life for at least one mobile station having a relatively low expected battery life, a corresponding responsive decision can be made to reduce the quality of service as corresponds to the leg that directly supports that mobile station. This could comprise, for example, reducing the quality of service by scheduling a reverse link transmission for a time when the wireless communication system may more likely reliably receive the reverse link transmission notwithstanding transmission by the mobile station using a reduced power level (where those skilled in the art will recognize that such scheduling may well entail delaying the reverse link transmission to effect this purpose).

As another example, when the information regarding mobile stations comprises information regarding a relatively large number of mobile stations as comprise communication targets in the mobile to mobile communication, modifying the quality of service in a corresponding leg can comprise initiating early channel acquisition for an originating mobile station such that the originating mobile station experiences an improved quality of service while target mobile stations experience a reduced quality of service. This can be appropriate when a significant number of communication targets exist because the likelihood rises with such numbers that at least some of the communication targets will experience an incidental reduced quality of service in any event. Accordingly, providing a higher quality of service for some of the communication targets will likely not prove beneficial to the group as the communication targets that are going to experience an incidental reduced quality of service represent, so to speak, the weak links in the chain. In turn, by intentionally reducing the quality of service for these communication targets the associated burden on the resources of the communication system are reduced as well.

In the examples provided above, decisions are made with respect to intentionally altering a delivered level of quality of service as will be provided to one or more of the mobile stations that comprise a part of a corresponding mobile to mobile communication. These teachings may also comprise, however, determining whether to modify quality of service for another communication that is unrelated to the mobile to mobile communication at issue.

For example, in a group call (which typically comprises a call from a single source platform to many target mobile stations), these teachings tend to promote using better quality of service on the speaker leg/reverse link and worse quality of service on the forward/listener link. As a result, however, the system may become unbalanced such that extra capacity may characterize the forward link while the reverse link may have little corresponding capacity because the lower quality of service on the reverse link will tend to consume considerable reverse link capacity while the higher quality of service on the forward link may effectively save capacity on this link.

This effect may be further magnified where there are relatively more group calls and as compared to private calls (wherein a private call typically comprises a single source platform transmitting to a single target mobile station). When this occurs the private calls may be managed in a manner to try to further balance out this overall resource utilization problem described above by using worst (or at least reduced) quality of service on the reverse link and better quality of service on the forward link. Additionally, the differential between the reverse and forward link quality of service may be biased to a larger value when the system has more group calls and fewer private calls.

So configured, these teachings can comprise obtaining information regarding at least one of power requirements as correspond to each leg of the mobile to mobile communication, a number of mobile stations as comprise communication targets in the mobile to mobile communication and that do not share a same sector using a shared channel, and/or expected battery life for at least one mobile station as comprises the mobile to mobile communication and using that information to effect relative degradation of quality of service on a leg of the mobile to mobile communication as corresponds to at least one of relatively low mobile station power requirements, a leg comprising a reverse speaker leg and corresponding target legs are relatively few in number, and/or a leg comprising a reverse speaker leg and the corresponding mobile station has a relatively low expected battery life, while at least maintaining quality of service on remaining legs of the mobile to mobile communication.

When making such a decision, it may be appropriate at least in some application settings to decide to not so degrade the quality of service when the wireless communication system if loaded beyond some predetermined threshold. The value of this threshold will of course vary with the specifics of a given system and the needs or requirements as prescribed by a corresponding system administrator. Such a threshold may also comprise either a relatively static value that tends not to change over time or a dynamically active value that varies in response to one or more conditions of interest. For example, the threshold value can vary by time of day or day of the week or can vary with respect to a priority level as is associated, for example, with a mobile station that is originating a given mobile to mobile communication.

As another example when making such a decision, it may also be appropriate at least in some application settings to decide to not so degrade the quality of service when the mobile stations as comprise the mobile to mobile communication are all relatively lower priority network entities.

If desired, these teachings may further provide for improving quality of service on at least one leg of the mobile to mobile communication as corresponds to at least one of relatively higher mobile station power requirements and/or a leg comprising a reverse speaker leg and corresponding target legs that do not share a common sector are relatively large in number.

Figure 2:
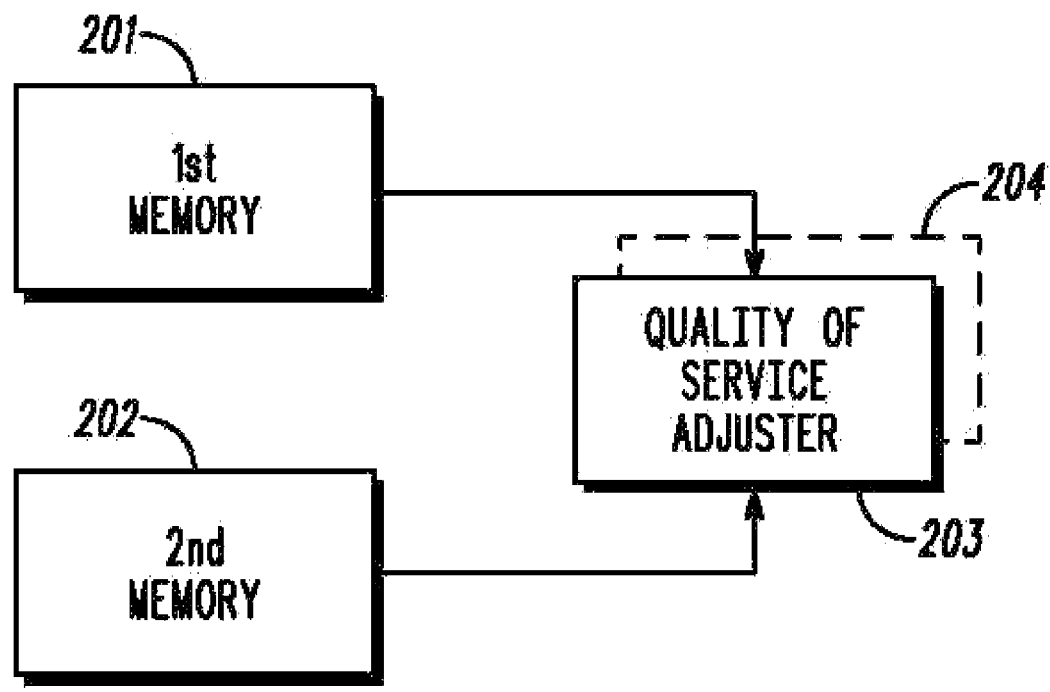
FIG. 2 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 2, an illustrative approach to such a platform will now be provided.

This apparatus 200 can comprise a stand-alone platform or can be integrated, in whole or in part, with other network elements as comprise a given wireless communication system and/or a server-based platform that provides system capacity control facilitation services to such a wireless communication system. In this embodiment this apparatus 200 comprises a first memory 201 and a second memory 202 that operably couple to a quality of service adjuster 203. The first memory 201 serves, in this embodiment, to store therein information regarding at least one of power requirements for each mobile station as comprises a given mobile to mobile communication, a number of mobile stations as comprise communication targets in the mobile to mobile communication, and/or expected battery life for at least one mobile station as comprises the mobile to mobile communication (such as has been described above). Similarly, the second memory 202 can serve to store therein information regarding which leg of the mobile to mobile communication exhibits better radio frequency communication conditions (if any, and again as described above).

The quality of service adjuster 203 serves, in this embodiment, to determine whether to modify the quality of service for at least one leg of the mobile to mobile communication as a function, at least in part, of such information as is stored and available in the first and second memories 201 and 202. As described above this can comprise determining whether to modify the quality of service by increasing the quality of service for such a leg or by decreasing the quality of service for such a leg.

For example, the quality of service adjuster 203 may determine to increase the quality of service for a leg that exhibits at least one of better radio frequency communication conditions than other legs in the mobile to mobile communication, a leg that serves as a source leg in the mobile to mobile communication that serves more than a threshold number of communication targets, and/or a leg that serves as a target leg when a source of the mobile to mobile communication has less than a threshold amount of battery life remaining. As another example, the quality of service adjuster 203 may determine to decrease the quality of service for a leg that exhibits at least one of worse radio frequency communication conditions than other legs in the mobile to mobile communication, a leg that serves as a target leg in a mobile to mobile communication that serves more than a threshold number of communication targets, and/or a leg that serves as a communication source leg in a mobile to mobile communication where a source of the mobile to mobile communication has less than a threshold amount of battery life remaining (as ascertained using, for example, the information stored in the first and second memories 201 and 202 and as is otherwise described above).

In the examples provided above, the quality of service adjuster 203 is configured and arranged to determine whether to adjust quality of service for a leg as corresponds to a mobile station participant of the mobile to mobile communication. If desired, however, this quality of service adjuster 203 can be further configured and arranged to provide a mechanism 204 to determine whether to modify quality of service for another communication that is unrelated to the mobile to mobile communication as a result of the mobile to mobile communication itself (where, for example, the other communication comprises a private call).

Those skilled in the art will recognize and understand that such an apparatus 200 may be comprised of a plurality of physically distinct elements as is suggested by the illustration shown in FIG. 2. It is also possible, however, to view this illustration as comprising a logical view, in which case one or more of these elements can be enabled and realized via a shared platform. It will also be understood that such a shared platform may comprise a wholly or at least partially programmable platform as are known in the art.

By these teachings, bandwidth intensive services, such as streaming services, are capable of being provided with less waste of system capacity. This benefit is owing, at least in part, to a disclosed ability to become sensitive to and leverage the use of quality of service with greater granularity than is otherwise typically afforded by the prior art where, for example, only end-to-end quality of service tends to comprise a point of control strategy.

Such prior art approaches are particularly burdensome in settings where a participating mobile platform is located, for example, relatively distal to a point of wireless attachment. A mobile station operating under such conditions and in accord with prior practice can readily require a 15× expenditure of radio frequency power, a 3× increase with respect to modem capacity, a 4× increase with respect to allocated Walsh codes, and a 2× increase with respect to depletion of that mobile station's battery resources.

Those skilled in the art will understand and appreciate that these benefits may accrue in a given instance notwithstanding that both mobile stations as participate in a mobile to mobile communication are operating in essentially equally loaded sectors. It is estimated that these teachings can improve system capacity by, for example, approximately 1.15× (with a somewhat larger improvement being expected as the number of larger group calls increases). These teachings are also expected to provide a mobile station battery life improvement of approximately 1.5× (for platforms that are running low with respect to their on-board power reserves). Those skilled in the art will appreciate that these teachings are readily applied to a variety of services including essentially all mobile to mobile streaming services (such as, but not limited to, Voice Over Internet Protocol, streaming video, and so forth).

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, these teachings could be implemented, at least in part, via a push-to-talk client device by configuring the latter to request a quality of service that is commensurate with a relative number of legs between parties within a call and the number of parties participating in that call. It would also be possible, for example, to instantiate these teachings by providing for process initiation via cellular array processor/high-speed downlink packet access cellular frame relay infrastructure.

I claim:

1. A method to facilitate system capacity control in a wireless communication system with respect to a mobile to mobile communication by adjusting quality of service for at least one leg of the mobile to mobile communication comprising:
providing information regarding at least one of:
power requirements for each mobile station as comprise the mobile to mobile communication;
a number of mobile stations as comprise communication targets in the mobile to mobile communication;
expected battery life for at least one mobile station as comprises the mobile to mobile communication;
determining which leg of the mobile to mobile communication exhibits better radio frequency communication conditions;
determining whether to modify the quality of service for at least one leg of the mobile to mobile communication by at least one of:
increasing the quality of service for the leg that exhibits at least one of:
better radio frequency communication conditions than other legs in the mobile to mobile communication;
serving as a source leg in a mobile to mobile communication serving more than a threshold number of communication targets;
serving as a target leg and a source of the mobile to mobile communication has less than a threshold amount of battery life remaining; and
decreasing the quality of service for the leg that exhibits at least one of:
worse radio frequency communication conditions than other legs in the mobile to mobile communication;
serving as a target leg in a mobile to mobile communication serving more than a threshold number of communication targets;
serving as a communication source leg in a mobile to mobile communication where a source of the mobile to mobile communication has less than a threshold amount of battery life remaining;
as a function, at least in part, of the information.

2. The method of claim 1 wherein providing information regarding power requirements for each mobile station as comprises the mobile to mobile communication comprises providing information regarding received signal strength.

3. The method of claim 1 wherein providing information regarding a number of mobile stations as comprise communication targets in the mobile to mobile communication comprises providing information regarding a total number of mobile stations as comprise the communication targets.

4. The method of claim 3 wherein providing information regarding a number of mobile stations as comprise communication targets in the mobile to mobile communication further comprises providing information regarding a number of infrastructure communication resources of the wireless communication system as are used, substantially in parallel, to support the mobile to mobile communication.

5. The method of claim 1 wherein the quality of service to be adjusted comprises at least one of:
delay jitter;
scheduling priority;
block error rate;
block error loss;
bit rate;
inactivity timer;
anticipatory link creation;
anticipatory partial link establishment;
anticipatory resource allocation;
an anticipatory request;
anticipatory overhead message scanning;
anticipatory placement of a mobile station into a mobility tracking mode.

6. The method of claim 1 further comprising:
determining whether to modify quality of service for another communication unrelated to the mobile to mobile communication as a result of the mobile to mobile communication.

7. The method of claim 6 wherein the another communication comprises a private call.

8. The method of claim 7 wherein modifying the quality of service for another communication unrelated to the mobile to mobile communication comprises worsening quality of service for a reverse link as corresponds to the private call.

9. The method of claim 1 wherein the information comprises expected battery life for at least one mobile station as comprises the mobile to mobile communication and wherein modifying the quality of service further comprises reducing the quality of service for a mobile that has a relatively low expected battery life.

10. The method of claim 9 wherein reducing the quality of service comprises scheduling a reverse link transmission for a time when the wireless communication system may more likely reliably receive the reverse link transmission notwithstanding transmission at a reduced power level.

11. The method of claim 1 wherein the mobile to mobile communication comprises at least one of:
a voice communication;
a file transfer;
a data transfer as corresponds to current game play;
a presence update;
a video communication;
a music communication;
a push-to-talk communication;
call control signaling;
Session Initiation Protocol-compatible signaling;
a bidirectional transfer;
a half-duplex transfer.

12. The method of claim 1 wherein providing information comprises providing information regarding a number of mobile stations as comprise communication targets in the mobile to mobile communication and wherein modifying the quality of service comprises initiating early channel acquisition for an originating mobile station such that the originating mobile station experiences an improved quality of service and target mobile stations experience a reduced quality of service.

13. An apparatus to facilitate system capacity control in a wireless communication system with respect to a mobile to mobile communication by adjusting quality of service for at least one leg of the mobile to mobile communication comprising:
a first memory having stored therein information regarding at least one of: power requirements for each mobile station as comprises the mobile to mobile communication;
a number of mobile stations as comprise communication targets in the mobile to mobile communication;
expected battery life for at least one mobile station as comprises the mobile to mobile communication;
a second memory having stored therein information regarding which leg of the mobile to mobile communication exhibits better radio frequency communication conditions;
a quality of service adjuster that is operably coupled to the first and second memory and that is configured and arranged to determine whether to modify the quality of service for at least one leg of the mobile to mobile communication by at least one of: increasing the quality of service for the leg that exhibits at least one of: better radio frequency communication conditions than other legs in the mobile to mobile communication;
serving as a source leg in a mobile to mobile communication serving more than a threshold number of communication targets; serving as a target leg and a source of the mobile to mobile communication has less than a threshold amount of battery life remaining; and
decreasing the quality of service for the leg that exhibits at least one of: worse radio frequency communication conditions than other legs in the mobile to mobile communication; serving as a target leg
in a mobile to mobile communication serving more than a threshold number of communication targets; serving as a communication source leg in a mobile to mobile communication where a source of the mobile to mobile communication has less than a threshold amount of battery life remaining; as a function, at least in part, of the information.

14. The apparatus of claim 13 wherein the quality of service to be adjusted comprises at least one of:
delay jitter;
scheduling priority;
block error rate;
block error loss;
bit rate;
inactivity timer;
anticipatory link creation;
anticipatory partial link establishment;
anticipatory resource allocation;
an anticipatory request;
anticipatory overhead message scanning;
anticipatory placement of a mobile station into a mobility tracking mode.

15. The apparatus of claim 13 wherein the information regarding a number of mobile stations as comprise communication targets in the mobile to mobile communication comprises providing information regarding a total number of mobile stations as comprise the communication targets.

16. The apparatus of claim 13 further comprising:
means operably coupled to the quality of service adjuster for determining whether to modify quality of service for another communication unrelated to the mobile to mobile communication as a result of the mobile to mobile communication.

17. The apparatus of claim 16 wherein the another communication comprises a private call.

* * * * *